March 24, 1970 N. E. ANDERSEN 3,502,139
PLANETARY COOLERS FOR USE WITH ROTARY KILNS
Filed March 20, 1968 2 Sheets-Sheet 1

INVENTOR
NIELS E. ANDERSEN
BY
ATTORNEYS

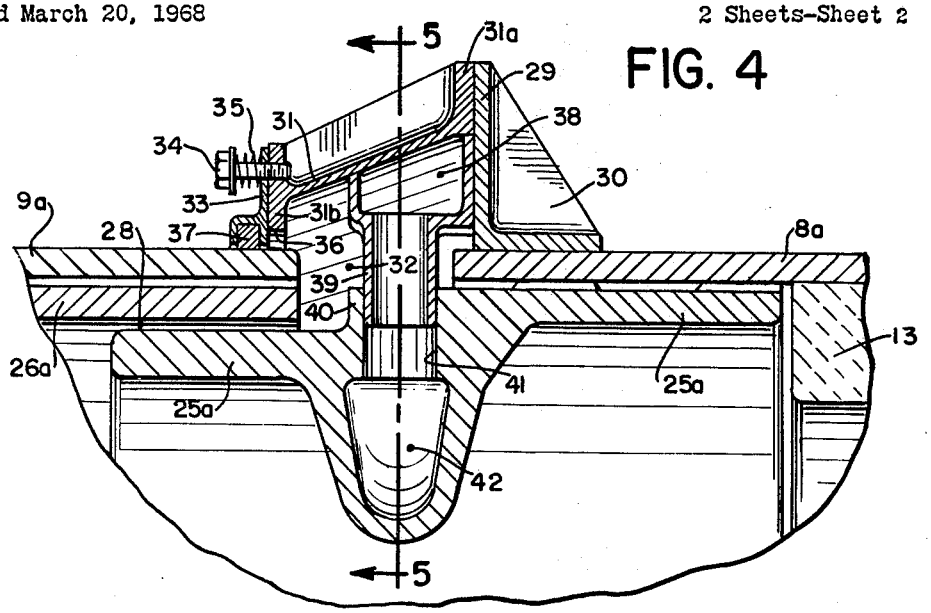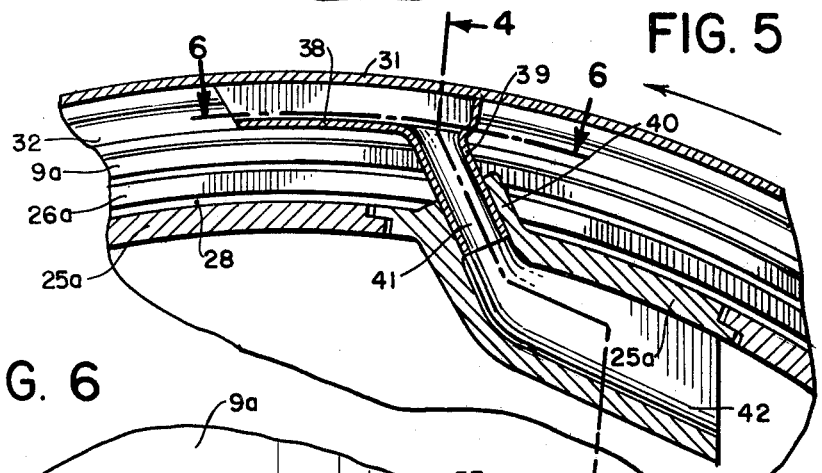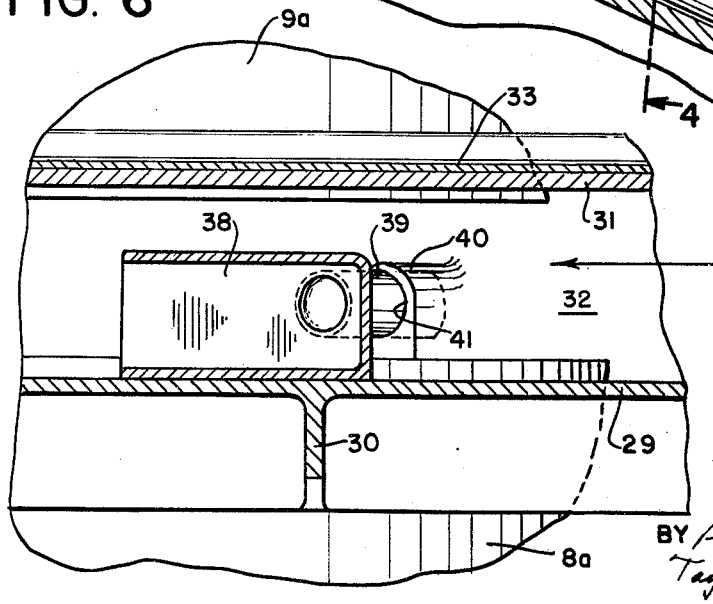

United States Patent Office 3,502,139
Patented Mar. 24, 1970

3,502,139
PLANETARY COOLERS FOR USE
WITH ROTARY KILNS
Niels E. Andersen, Copenhagen-Valby, Denmark, assignor to F. L. Smidth & Co., New York, N.Y., a corporation of Delaware
Filed Mar. 20, 1968, Ser. No. 714,613
Claims priority, application Great Britain, Mar. 22, 1967, 13,531/67
Int. Cl. F28d 11/08; F25b 29/00; F27b 7/00
U.S. Cl. 165—88                        3 Claims

ABSTRACT OF THE DISCLOSURE

Planetary cooling tubes for cooling cement clinker and other kiln products. Where these cooling tubes are of great length so that they cannot be easily handled they are made in two or more lengthwise sections and the sections are joined to one another by lengthwise slidable joints of special construction. The cooling tube sections are carried by supports which permit the adjacent ends of the tube sections to shift lengthwise relatively to each other, the joints advantageously being so constructed as to collect dust escaping from the tubes and return the dust to the interior of the tube sections.

BACKGROUND OF THE INVENTION

Field of the invention

As in most other industrial fields new machines for the cement industry have greater and greater outputs. The sizes of rotary kilns and consequently also the sizes of the planetary coolers in which the burnt material is cooled have therefore increased rapidly in recent years.

The individual cooling tubes of planetary coolers have therefore become of such a size and weight that they are rather inconvenient to handle during transport and erection. Also, temperature variations during operation of the cooler may involve troubles caused by rather considerable temperature stresses.

SUMMARY OF THE INVENTION

To overcome these difficulties, according to this invention, each cooling tube of a planetary cooler is divided transversely into two or more sections, which can be transported separately, and which are arranged to be connected together and mounted so that, in use, they expand and contract independently of each other.

Each section is preferably carried by two supports which are arranged to be mounted on the kiln tube or an extension of this tube, one of the supports being fixed to the section while the other one permits longitudinal movements of the section. This mode of assembling the individual cooling tubes and the kiln tube helps to equalize stresses produced by temperature variations. The fixed support of each section may be positioned at the inlet end of the section and the support which allows movement at the outlet end.

The cooling tube sections may advantageously be arranged to be connected to each other by spigot and socket joints, and the connection between the kiln tube and the first cooling tube section may be arranged also to be of the spigot and socket type. This ensures that the connection between the kiln tube and each cooling tube and between the individual sections of each cooling tube, remains tight in spite of expansion and contraction.

The spigot and socket joints may be provided with annular seals which permit axial and radial movement so that sealing is provided during all operating conditions.

Each annular seal may comprise a sealing member carrying two annular seals, one of which is held against a flange which projects from one cooling tube section so that it extends radially with respect to the section to allow relative radial movement, and the other of which is held against the cylindrical outer surface of the adjacent cooling tube section to allow relative axial movement.

As will be appreciated, the spigot and socket joints are unusual since such joints normally only permit relatively axial movements to take place. By using the joints just described it is not only possible to substantially reduce leakage of dust which emanates from the products travelling along the cooling tubes and which tends to escape from the connections between adjacent sections of those tubes, but also to avoid undersirable temperature stresses which with very large coolers might be so considerable that they might adversely influence the operation of the kiln.

In order to reduce the leakage of dust still further, and perhaps eliminate it altogether, each cooling tube may have a device which surrounds the connection between adjacent sections of the tube and catches dust which escapes between the adjacent ends of the two sections, the device including means for returning the dust back into the tube.

Preferably the dust catching device comprises an annular casing which is shaped so that, in use, the dust escaping between the tube sections is directed into an annular channel formed by the casing, the means for returning the dust into the tube comprising at least one duct having an inlet in the channel and an outlet which opens into one of the tube sections, the duct being arranged so that in use, as a consequence of the rotation of the cooling tubes about the kiln axis as the planetary cooler rotates, dust enters the duct inlet and then falls along the duct back into the cooling tube.

Several embodiments of a planetary cooler constructed in accordance with the present invention, and mounted on a rotary kiln are illustrated in the accompanying drawings.

Brief description of drawings

FIGURE 4 shows to a larger scale a detail at A in FIGURE 1 illustrating a modification;

FIGURE 5 shows a transverse section to the same scale on line 5—5 of FIGURE 4; and FIGURE 6 is a vertical section taken along the line 6—6 in FIGURE 5.

Figure 1:
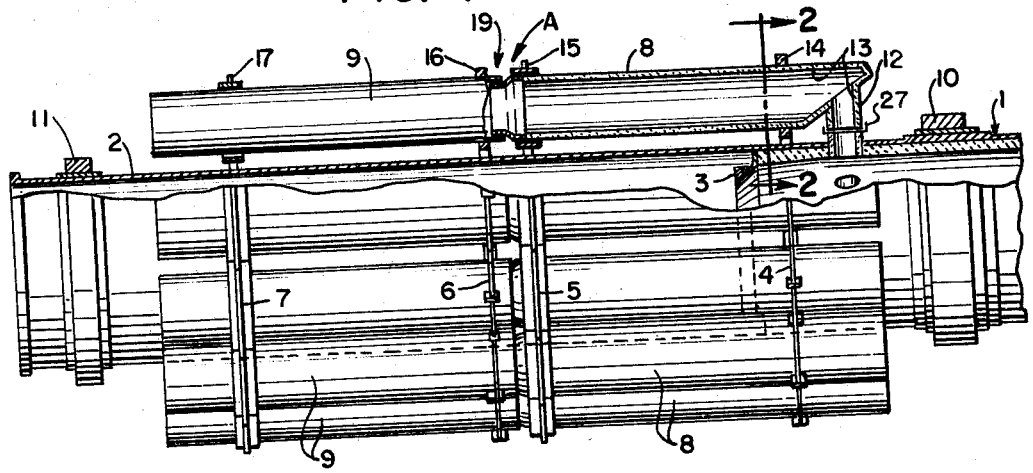
FIGURE 1 is a diagrammatic vertical side elevation and partial central section through the discharge end portion of the kiln and one of the cooling tubes of the planetary cooler.

A kiln 1, of which only a very limited part near the outlet end is shown, has a hood 2 forming an extension beyond an end plate 3. The hood 2 encloses the space to the left of the end plate 3 and carries supporting plates 4, 5, 6 and 7 on which the cooling tubes are mounted in a manner to be described. Each tube is divided into an inlet section 8 and an outlet section 9. The kiln 1 and the hood 2 are supported in the usual manner by suitably spaced live rings 10 and 11 surrounding the kiln tube and hood respectively and resting on conventional supporting rollers which are not shown. The ring 10 is the endmost live ring on the kiln 1 and the ring 11 surrounds the hood 2.

Each cooling tube section 8 is connected with the kiln 1 by an inlet conduit 12, through which the burnt material enters the cooling tube when the conduit 12 is in its lowermost position beneath the kiln. As the kiln is arranged at a slight inclination, the material moves by gravity through the cooling tubes from the right to the left, leaving the tubes through their open left-hand ends.

The inlet sections 8 of the cooling tubes and the inlet conduits 12 are each provided with a fire-resistant brick lining 13 as is usual and the inlet sections 8 are provided with conventional lifting scoops (not shown) which lift the material conveyed through the tubes and cause it to fall freely across the tube as the tube rotates, so that the cooling capacity of the tubes is increased. To increase the cooling surface, the outlet sections 9 are provided with conventional suspended chains or other similar means, which have been omitted in the drawings for the sake of clarity.

The outlet sections 9 of the cooling tubes do not usually have a fire-resistant brick lining since, in use, the temperature of these sections is considerably lower than that in the inlet sections 8.

Figure 2:
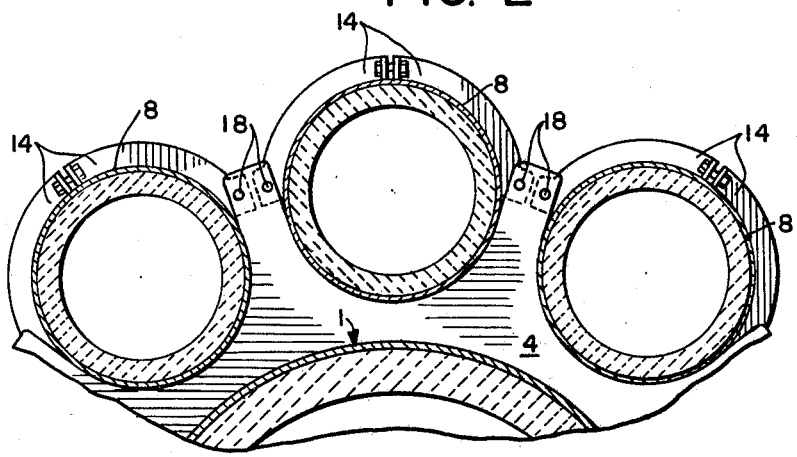
FIGURE 2 is a fragmentary section taken at right angles to the axis of the rotary kiln as seen in the direction of the arrows on the line 2—2 in FIGURE 1.

The cooling tubes sections 8 and 9 are retained in the supporting plates 4, 5, 6 and 7 by attachment devices 14, 15, 16 and 17. The devices 14 and 16 are divided clamps (FIG. 2) arranged in pairs and each pair secured together by a bolt and nut. They are pivoted on pins 18 and are assembled on plates 4 and 6 around strengthened portions of the cooler tube sections. The devices 15 and 17 are arranged so that in their assembled state there is a cirular clearance as shown in FIG. 1 around likewise strengthened portions of the cooling tube sections.

This clearance permits the individual cooling tube sections to move freely in an axial direction at their outlet ends so that temperautre stresses may be eliminated or substantially reduced. The axial movement of the cooling tube sections in relation to their annular supports is facilitated during the rotary movement of the kiln because the sections rest on the supports at continually changing points of contact around their peripheries.

Figure 3:
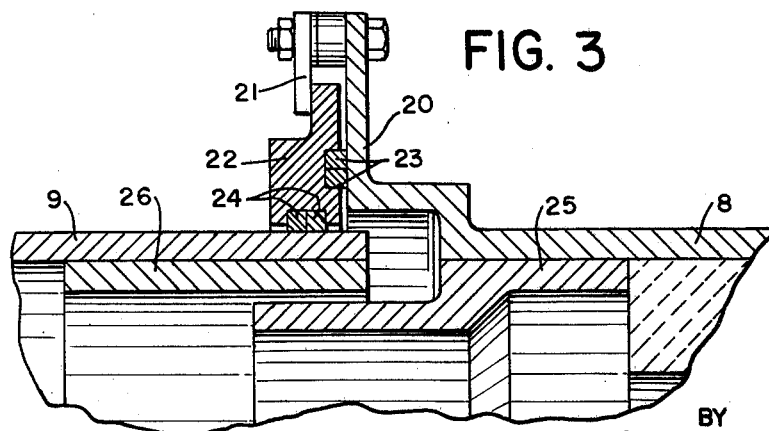
FIGURE 3 shows to a larger scale a detail at A in FIGURE 1.

The cooling tube sections 8 and 9 are connected with each other by spigot and socket joints 19 (FIG. 1), but in the modification shown in FIGURE 3, these joints are provided only with annular seals permitting both relative axial and radial movements. In the modification shown in FIGURES 4 to 6, these joints are provided with dust catching devices as well as annular seals which permit relative axial and radial movements.

As shown in FIGURE 3, the shell of the inlet section 8 is provided at the outlet end with a sealing flange 20, which may be divided radially into a number of sections to facilitate mounting. An annular sealing member 22 which may likewise be divided into sections, is attached to the sealing flange 20 by means of lugs 21 bolted to the flange. Sealing rings 23 are mounted in a circular groove in the face of the member 22 which is directed towards the flange 20. These rings, which are preferably of copper asbestos, form a seal between the two cooling tube sections to allow relative radial movements.

Two further rings 24 are held in a circular groove in the inner face of the sealing member 22 and bear against the outer surface of cooling tube section 9. These rings, which are also preferably of copper-asbestos, form a seal between the two cooling tube sections which permits relative axial movements.

At the junction between the two cooling tube sections there is an inside lining of generally cylindrical cover plates 25 and 26, preferably of cast iron, which restrict the solid material conveyed through the tubes from falling out into contact with the seals 23 and 24. Cover plate 25 in the inlet section 8 extends, with a suitable radial clearance, a little within the spigot and socket connection. Both cover plates 25 and 26 may be divided radially into a number of sections to facilitate mounting.

In each of the inlet conduits 12 from the kiln 1 to the inlet cooling tube section 8, there is a spigot and socket joint 27 shown diagrammatically in FIGURE 1 to accommodate movement and avoid temperature stresses. The joint 27 is similar in construction to the joint between the cooling tube sections 8 and 9.

However although the cover plates 25 and 26 prevent the solid material from falling out into the seal compartment containing seals 23 and 24 they do not prevent dust from finding its way into this compartment. If this dust is allowed to accumulate here, some inevitably finds its way past the seals 23 and 24. Although not serious, this may be prevented by providing a device which collects the dust which enters the seal compartment and returns it back into the cooling tube, and such a device is shown in the modified joint construction illustrated in FIGURES 4 to 6.

In this construction the basic structure is similar to that shown in FIGURE 3, the tube sections 8a and 9a of the cooling tube being connected by a spigot and socket joint which is formed by the generally cylindrical cover plates 25a and 26a.

However, the arrangement of the seal for the joint is slightly different, although it still permits relative axial and radial movements between the two tube sections.

Surrounding the outlet end of the tube section 8a is a ring 29 which is L-shaped in cross section, one branch of which is fixed on the outer surface of section 8a and the other branch of which forms a flange extending radially from section 8a. Surrounding the gap between the adjacent ends of the sections 8a and 9a is a conical shaped ring 31 having at its wide end a flange 31a which extends radially outwards with respect to the axis of the cooling tube and which is fixed by bolting or otherwise (not shown) to the radially extending flange of the ring 29.

The narrow end of conical ring 31 has a flange 31b which extends radially with respect to the axis of the cooling tube, the inner edge of this flange encircling the outer surface of the section 9a with only a small annular gap 36 between them. This gap is sealed by a sealing ring 37 which is held in the forked inner end of a metal ring 33 which is fixed to flange 31b. Ring 33 is resiliently fitted to this flange by means of a number of bolts 34 which pass through radial slots in ring 33 and are screwed into the flange 31b. A helical compression spring 35 surrounds the shank of each bolt 34 and acts between the head of the bolt and the ring 33 to urge the ring 33 against the flange 31b. With this arrangement of ring 33, the joint between the two sections 8a and 9a is sealed while allowing both axial and radial relative movements between the sections.

The rings 29 and 31 are each split into four parts to facilitate assembly, and are joined by abutting flanges which form strengthening fins 30. Ring 33 is also split into four parts, each part overlapping the next to maintain the seal between it and the tube section 9a. These rings may be split into any other number of parts if desired.

In use, some dust from the clinker travelling along the cooling tubes will escape through the gap 28 between the spigot and socket of the sections 8a and 9a into a chamber 32 bounded by the conical ring 31. This dust falls to the bottom of the chamber 32 and is directed by the inclined conical ring 31 into a channel formed by the ring 31 and the radial flange of the ring 29. As the planetary cooler rotates about the kiln axis, the channel is also rotated about this axis but the dust continuously falls back to the lowermost position relative to the axis of the cooling tube.

Each cooling tube has a dust collector formed by a trough 38 which encloses part of the channel between the rings 29 and 31 at a point farthest from the kiln axis. This trough 38 forms a duct which is open ended in the direction of rotation of the cooling tubes about the kiln axis. This direction of rotation is shown by the arrows in FIGURES 5 and 6. The back end of this duct or trough communicates with a tube 39 which extends in an inward direction into a pasageway 41 in a projection 40 from the annular plate 25a which forms the spigot. Passageway 41 leads into a channel 42 which in turn opens into the inside of the cooling tube.

As the cooler rotates and each cooling tube passes through its lowest position, the trough 38 pases through the lowest position with respect to the axis of the cooling tube and thus the dust collected at this position enters the duct formed by the trough 38. As the cooler rotates through 90° the dust drops to the rear end of the duct, and after a further 90° of rotation the dust falls into the tube 39 and via the channel 42 back into the cooling tube 8a itself.

I claim:

1. A planetary cooler for use with a rotary kiln, comprising a plurality of cooling tubes disposed in a circular series exteriorly of and surrounding the discharge end portion of a kiln, means for conveying material from the kiln to one end of each cooling tube, each cooling tube being divided transversely into a plurality of sections, which can be transported separately, and means for interconnecting said tube sections while permitting them to expand and contract independently of each other, in which each connection between the cooling tube sections is surrounding by a device which catches dust escaping between the adjacent ends of the two sections, the device including means for returning the dust into the cooling tube.

2. A planetary cooler according to claim 1, in which the dust catching device comprises an annular casing which is shaped so that, in use, the dust escaping between the cooling tube sections is directed into an annular channel formed by the casing, the means for returning the dust to the cooling tube comprising at least one duct having an inlet in the channel and an outlet which opens into one of the cooling tube sections, the duct being arranged so that as a consequence of the rotation of the cooling tube about the kiln axis as the planetary cooler rotates, dust enters the duct inlet and then falls along the duct back into the cooling tube.

3. A planetary cooler according to claim 2, in which the casing is conical in shape and is fastened at its wide end to a radially extending flange on the cooling tube section nearest the inlet of the tube to form the channel between them, the narrow end of the casing surrounding the inlet end of the other tube section and the annular seal bridging the gap between the narrow end of the casing and the other tube section.

References Cited

UNITED STATES PATENTS

| 1,490,590 | 4/1924 | Carlson | 165—88 |
| 2,346,526 | 4/1944 | Walker | 165—58 |
| 2,971,751 | 2/1961 | Andersen. | |

MEYER PERLIN, Primary Examiner

U.S. Cl. X.R.

165—58; 263—32